United States Patent
Lee et al.

(10) Patent No.: US 7,620,107 B2
(45) Date of Patent: Nov. 17, 2009

(54) VIDEO TRANSCODING METHOD AND APPARATUS AND MOTION VECTOR INTERPOLATION METHOD

(75) Inventors: Yung-lyul Lee, Seoul (KR); Sung-sun Lee, Seoul (KR)

(73) Assignees: Samsung Electronics Co., Ltd., Suwon-si (KR); Sejong Industry - Academy Cooperation Foundation, Seoul (KR)

( * ) Notice: Subject to any disclaimer, the term of this patent is extended or adjusted under 35 U.S.C. 154(b) by 946 days.

(21) Appl. No.: 11/074,078

(22) Filed: Mar. 8, 2005

(65) Prior Publication Data

US 2005/0201463 A1  Sep. 15, 2005

(30) Foreign Application Priority Data

Mar. 12, 2004  (KR)  ............... 10-2004-0016798

(51) Int. Cl.
*H04N 7/12* (2006.01)
(52) U.S. Cl. ............... 375/240.16; 375/240.24; 375/240.12
(58) Field of Classification Search ............... 375/240, 375/340.03, 240.12, 240.16, E7.148, 240.07, 375/240.22–240.26; 348/699
See application file for complete search history.

(56) References Cited

U.S. PATENT DOCUMENTS

| | | | | |
|---|---|---|---|---|
| 5,198,901 | A * | 3/1993 | Lynch | 375/240.14 |
| 6,058,143 | A * | 5/2000 | Golin | 375/240.16 |
| 6,441,754 | B1 | 8/2002 | Wang et al. | |
| 6,931,064 | B2 * | 8/2005 | Mori et al. | 375/240.16 |
| 7,236,529 | B2 * | 6/2007 | Lin et al. | 375/240.2 |
| 2003/0053543 | A1 * | 3/2003 | Bhaumik et al. | 375/240.16 |
| 2003/0174770 | A1 * | 9/2003 | Kato et al. | 375/240.2 |
| 2004/0057523 | A1 * | 3/2004 | Koto et al. | 375/240.26 |
| 2004/0202250 | A1 * | 10/2004 | Kong et al. | 375/240.16 |
| 2004/0264571 | A1 * | 12/2004 | Zhang et al. | 375/240.16 |

(Continued)

FOREIGN PATENT DOCUMENTS

KR  2000-0061805 A  10/2000

(Continued)

OTHER PUBLICATIONS

"An Improved MPEG-4 Coder Using Lagrangian Coder Control", Heiko Schwarz and Thomas Wiegand, Heinrich Hertz Institute, Germany, Mar. 23, 2001.

(Continued)

*Primary Examiner*—Tesfaldet Bocure
*Assistant Examiner*—Lawrence B Williams
(74) *Attorney, Agent, or Firm*—Sughrue Mion, PLLC

(57) ABSTRACT

A transcoding method and apparatus and a motion vector interpolation method. The transcoding method and apparatus convert moving picture data from one encoding format to another encoding format. The transcoding method includes (a) decoding an image coded in a first encoding method and then obtaining encoding mode information and motion vector information of each block of the image; (b) selecting at least one of available encoding modes of a second encoding method based on the encoding mode information of each block of the decoded image; and (c) performing a motion estimation process on each block of the decoded image in the at least one selected encoding mode and then determining an optimal encoding mode for each block of the decoded image based on the motion estimation result(s).

19 Claims, 10 Drawing Sheets

U.S. PATENT DOCUMENTS

2005/0063465 A1* 3/2005 Cote et al. ............. 375/240.12
2005/0135484 A1* 6/2005 Lee et al. ................ 375/240.16
2005/0243930 A1* 11/2005 Asano et al. ........... 375/240.16

FOREIGN PATENT DOCUMENTS

| KR | 2002-0045366 A | 6/2002 |
|---|---|---|
| KR | 2003-0015950 A | 2/2003 |
| KR | 2003-0039069 A | 5/2003 |

OTHER PUBLICATIONS

"The Emerging H.264/AVC Standard", Ralf Schafer, Thomas Wiegand, and Heiko Schwarz, Heinrich Hertz Institute, Berlin, Germany, EBU Technical Review, Jan. 2003.

* cited by examiner

VIDEO TRANSCODING METHOD AND APPARATUS AND MOTION VECTOR INTERPOLATION METHOD

BACKGROUND OF THE INVENTION

This application claims priority from Korean Patent Application No. 2004-16798, filed on Mar. 12, 2004, in the Korean Intellectual Property Office, the disclosure of which is incorporated herein in its entirety by reference.

1. Field of the Invention

The present invention relates to transcoding of moving pictures, and more particularly, to a transcoding method and apparatus, which convert moving picture data from one encoding format to another encoding format, and a motion vector interpolation method therefor.

2. Description of the Related Art

Recent developments in computer and communications technologies have enabled considerable amounts of multimedia data to be transmitted via networks. Accordingly, various methods for encoding multimedia data and transmitting the multimedia data over a network have been suggested. Since a sending party and a receiving party, between which multimedia data are transmitted, are more likely to be under different circumstances, the multimedia data needs to be converted from one encoding format to another encoding format in consideration of the quality-of-service of each of the sending and receiving parties. This type of conversion is called transcoding. A video transcoding method includes a pixel-domain transcoding method and a frequency-domain transcoding method, (e.g., a discrete cosine transform (DCT)-domain transcoding method).

In order to perform a pixel-domain transcoding process on moving picture data, it is necessary to decode and then encode the moving picture data, in which case, motion estimation should be re-executed on each macroblock of each frame of the moving picture data. Therefore, it takes much time to transcode the moving picture data, and it is difficult to transmit the transcoded moving picture data in real time.

SUMMARY OF THE INVENTION

The present invention provides a transcoding method and apparatus, which can efficiently transcode data by appropriately converting an encoding mode and a motion vector of each block used for motion prediction into an encoding mode and a motion vector of each block used in an encoding method in which the data is to be transcoded, and a motion vector interpolation method for the transcoding method and apparatus.

According to an aspect of the present invention, there is provided a transcoding method. The transcoding method includes (a) decoding an image coded in a first encoding method and then obtaining encoding mode information and motion vector information of each block of the image; (b) selecting at least one of available encoding modes of a second encoding method based on the encoding mode information of each block of the decoded image; and (c) performing a motion estimation process on each block of the decoded image in the at least one selected encoding mode and then determining an optimal encoding mode for each block of the decoded image based on the motion estimation result(s).

The transcoding method further includes (d) performing the motion estimation process on each block of the decoded image in the optimal encoding mode and outputting data coded in the second encoding method for the decoded image.

In (b), if an encoding mode of each block of the decoded image is an inter 16×16 mode, the inter 16×16 mode, an inter 16×8 mode, an inter 8×16 mode, and an intra 16×16 mode are selected as encoding modes for the second encoding method, and if the encoding mode of each block of the decoded image is an inter 8×8 mode, the inter 8×8 mode, an inter 8×4 mode, an inter 4×8 mode, and an intra 4×4 mode are selected as the encoding modes for the second encoding method.

In (b), if an encoding mode of each block of the decoded image is a skip mode, the skip mode, an inter 16×16 mode, and an intra 16×16 mode are selected as encoding modes for the second encoding method, and if the encoding mode of each block of the decoded image is an intra mode, the intra 16×16 mode and an intra 8×8 mode are selected as the encoding modes for the second encoding method.

In (c), a motion vector of a current block in a current frame of the decoded image is readjusted by performing the motion estimation process on the current block in the at least one selected encoding mode.

The first encoding method is an MPEG-4 encoding method, and the second encoding method is an H.264 encoding method.

According to another aspect of the present invention, there is provided a transcoding method. The transcoding method includes (a) calculating a motion vector of a current block by using areas of a predetermined block in a previous frame, corresponding to the current block, overlapping blocks of the previous frame and encoding mode information of the blocks overlapped by the predetermined block.

In (a), the motion vector of the current block is obtained by multiplying the areas of the predetermined block overlapping the blocks of the previous frame and the motion vectors of the blocks overlapped by the predetermined block and then averaging the multiplication results.

In (a), if the blocks overlapped by the predetermined block are 16×16 blocks, motion vectors of the corresponding blocks are weighted.

In (a), if each of the areas of the predetermined block overlapping the blocks of the previous frame has a length of 1 pixel or a width of 1 pixel, the blocks overlapped by the predetermined block are excluded from the calculation of the motion vector of the current block.

According to still another aspect of the present invention, there is provided a transcoding apparatus. The transcoding apparatus includes a decoder, which decodes an image coded in a first encoding method and outputs encoding mode information and motion vector information of each block of the image; and an encoder, which selects at least one of available encoding modes of a second encoding method based on the encoding mode information of each block of the decoded image, performs a motion estimation process on each block of the decoded image in the at least one selected encoding mode, determines an optimal encoding mode for each block of the decoded image based on the motion estimation result(s), performs the motion estimation process on each block of the decoded image in the optimal encoding mode, and outputs data coded in the second encoding method for the decoded image.

The encoder selects an inter 16×16 mode, an inter 16×8 mode, an inter 8×16 mode, and an intra 16×16 mode as encoding modes for the second encoding method, if an encoding mode of each block of the decoded image is the inter 16×16 mode, are selected as encoding modes for the second encoding method, and selects an inter 8×8 mode, an inter 8×4 mode, an inter 4×8 mode, and an intra 4×4 mode as the encoding modes for the second encoding method if the encoding mode of each block of the decoded image is the inter 8×8 mode.

The encoder selects a skip mode, an inter 16×16 mode, and an intra 16×16 mode as encoding modes for the second encoding method, if an encoding mode of each block of the decoded image is the skip mode, and selects the intra 16×16 mode and an intra 8×8 mode as the encoding modes for the second encoding method if the encoding mode of each block of the decoded image is an intra mode.

The encoder calculates the motion vector of the current block in a current frame of the decoded image by using areas of the predetermined frame overlapping the blocks of the previous frame and the encoding mode information of the blocks overlapped by the predetermined block.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
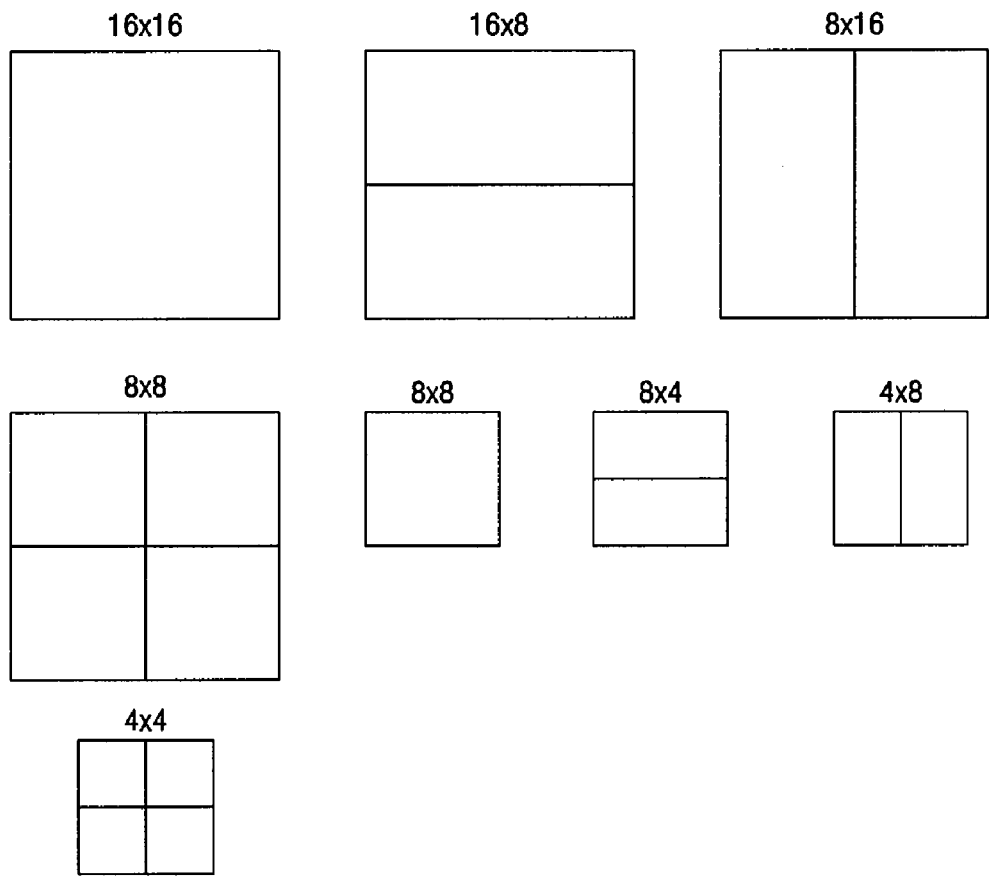
FIG. 1A is a diagram illustrating blocks used in an H.264 motion estimation method.

The present invention will now be described more fully with reference to the accompanying drawings, in which exemplary embodiments of the invention are shown.

A transcoding apparatus according to an exemplary embodiment of the present invention converts an MPEG-4 simple profile (SP)-encoded moving picture format into an H.264 baseline profile (BP)-encoded moving picture.

H.264 is the moving picture compression standard that has been established without taking into consideration compatibility with existing moving picture compression standards, such as H.261, H.263, MPEG-2, and MPEG-4. H.264 is also known as Part 10 of the ISO/IEC MPEG-4 standard. Therefore, H.264 and MPEG-4 have many different features from each other. For example, MPEG-4 performs a DCT process on an 8×8 block-by-8×8 block basis, while H.264 performs an integer-DCT process on a 4×4 block-by-4×4 block basis. In addition, MPEG-4 performs a motion estimation process on a half pixel-by-half pixel basis, while H.264 performs the motion estimation process on a quarter pixel-by-quarter pixel basis in order to improve the accuracy of the motion estimation process. Moreover, MPEG-4 performs an alternate current (AC)/direct current (DC) prediction process as an intra-prediction process, while H.264 performs the intra-prediction process in a spatial domain. Furthermore, MPEG-4 uses the Huffman table in a variable length encoding process, while H.264 uses a universal variable length code in the variable length encoding process.

In order to encode moving picture data according to the H.264 standard, each frame of the moving picture data is divided into a plurality of macroblocks, and each of the macroblocks is encoded in all encoding modes available for inter- and intra-predictions. Thereafter, one of the encoding modes is selected as an optimal encoding mode for the moving picture data based on the number of bits used to encode each of the macroblocks of the moving picture data in each of the encoding modes and the degree to which macroblocks obtained by decoding the encoded macroblocks of the moving picture data are distorted from the original macroblocks of the moving picture data (i.e., a rate-distortion cost of each of the encoding modes). Thereafter, each of the macroblocks is encoded in the optimal encoding mode. This process is called rate-distortion optimization (RDO).

A bit rate (R) indicates the number of bits used to encode a current macroblock, and distortion (D) indicates how much a restored macroblock obtained by encoding and then decoding the current macroblock is different from the current macroblock. Therefore, the distortion (D) can be only obtained after obtaining the restored current macroblock by using an inverse quantizer and an inverse transformer. A rate-distortion cost (RDcost) can be expressed by Equation (1) below:

$$RDcost = Distortion + \lambda \times Rate \quad (1)$$

where Distortion indicates how much the restored macroblock is different from the current macroblock and $\lambda$ is a Lagrangian constant. Distortion can be expressed by Equation (2) below:

$$Distortion = \sum_{k=0}^{15} \sum_{l=0}^{15} (B(k, l) - B'(k, l))^2 \quad (2)$$

where B(k, l) and B'(k, l) indicate values of pixels (k, l) of the current macroblock and the restored macroblock. The Lagrangian constant $\lambda$ is calculated using Equation (3) below:

$$\lambda = 0.85 \times 2^{\frac{QP}{3}} \quad (3)$$

where QP indicates an H.264 quantization value and an integer from 0 to 51.

An inter mode is an encoding mode for inter-prediction, in which motion vector information of at least one macroblock, selected from at least one reference frame that is referenced when a current macroblock of a current frame is coded, and differences between pixel values in the current macroblock of the current frame and pixel values in the selected macroblock (s) are coded. According to the H.264 standard, each frame may have up to 5 reference frames, and macroblocks of the reference frames are searched for in a frame memory, in which they are stored. The reference frames may be previous or subsequent ones to the current frame.

An intra mode is an encoding mode for intra-prediction, in which, pixel values in the current macroblock of the current frame are predicted without referring to the reference frames by using pixel values in neighboring macroblocks. Then, differences between the predicted pixel values in the current macroblock and the pixel values in the neighboring macroblocks are coded so that the current macroblock of the current frame can be coded.

FIG. 1A illustrates blocks used in an H.264 motion estimation method. Referring to FIG. 1A, according to the H.264 standard, a 16×16 macroblock may have blocks of 7 variable sizes, and each of the blocks has a motion vector. More specifically, the 16×16 macroblock can be divided into a 16×16 block, 16×8 blocks, 8×16 blocks, or 8×8 blocks. Each of the 8×8 blocks can be subdivided into a 8×8 block, 8×4 blocks, 4×8 blocks, or 4×4 blocks.

Figure 1B:
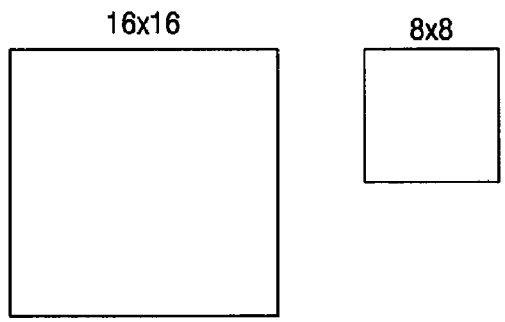
FIG. 1B is a diagram illustrating blocks used in an MPEG-4 motion estimation method.

FIG. 1B illustrates encoding modes used in an MPEG-4 motion estimation method. Referring to FIG. 1B, the MPEG-4 standard, unlike the H.264 standard that provides seven encoding modes, provides only two encoding modes, i.e., a 16×16 block encoding mode and an 8×8 block encoding mode. Therefore, an encoding mode of each macroblock of MPEG-4 image data may have to be converted into an H.264-compatible encoding mode when converting the MPEG-4 image data into H.264 image data.

Figure 2:
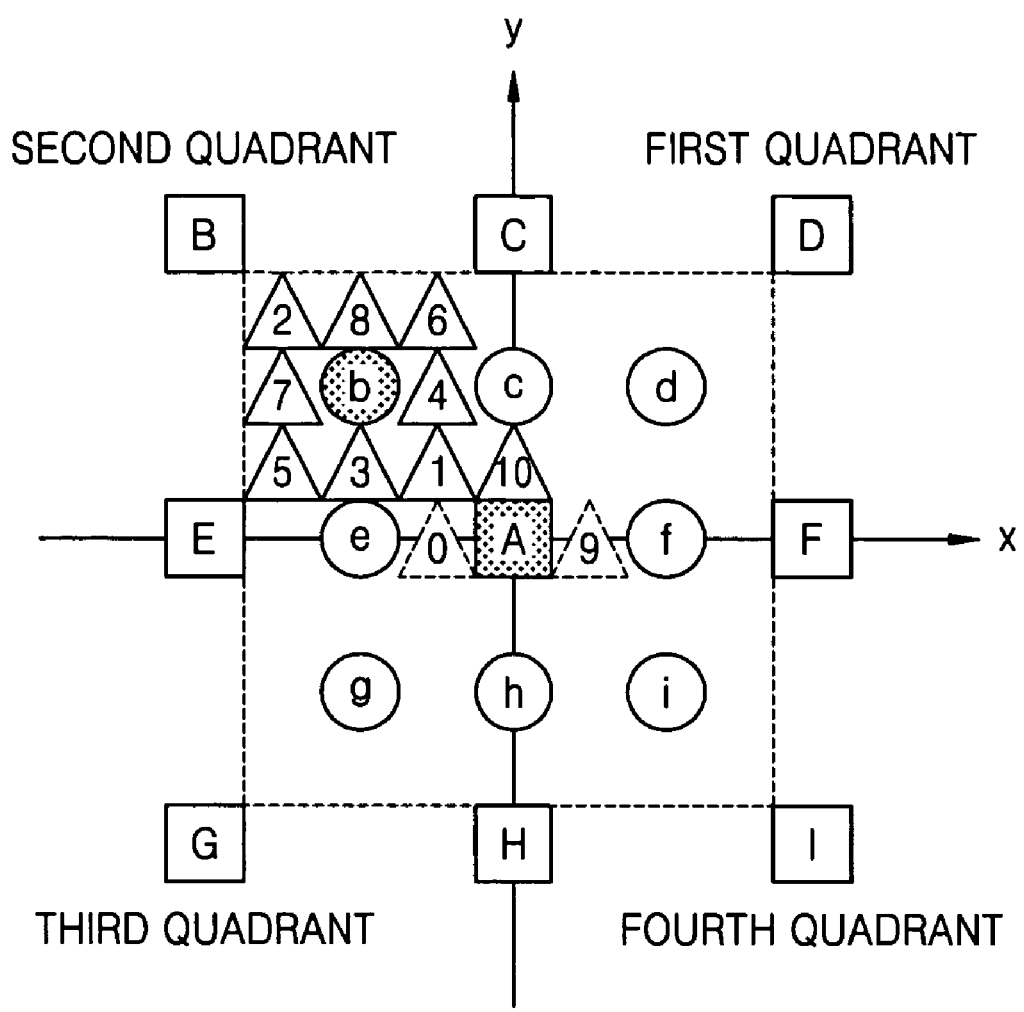
FIG. 2 is a diagram illustrating a method of determining a motion vector through a quarter pixel search in the H.264 standard.

FIG. 2 illustrates a method of determining a motion vector by searching for quarter pixels according to the H.264 standard. Referring to FIG. 2, A through I enclosed by rectangles indicate integer pixels, b through i enclosed by circles indicate half pixels, and 0 through 10 enclosed by triangles indicate quarter pixels.

One of the integer pixels A through I is determined as an optimal integer pixel by performing an integer pixel motion vector search on each of the integer pixels A through I in a predetermined ±16 pixel search domain. Supposing that the integer pixel A is determined as the optimal integer pixel, one of eight half pixels adjacent to the optimal integer pixel A, i.e., one of the half pixels b through i, is determined as an optimal half pixel by performing a half pixel motion vector search on each of the half pixels b through i. Supposing that the half pixel b is determined as the optimal half pixel, one of eight quarter pixels adjacent to the half pixel b, i.e., one of the quarter pixels 2, 8, 6, 7, 4, 5, 3, and 1, is determined as an optimal quarter pixel by performing a quarter pixel motion vector search on each of the quarter pixels 2, 8, 6, 7, 4, 5, 3, and 1.

The conversion of an MPEG-4 motion estimation mode into an H.264 motion estimation mode when converting an MPEG-4 moving picture into an H.264 moving picture will now be described in greater detail.

One of the existing pixel-domain transcoding methods is a cascaded pixel-domain transcoding method. The cascaded pixel-domain transcoding method decodes image data of an MPEG-4 bitstream and then encodes the decoded image data according to the H.264 standard. In the cascaded pixel-domain transcoding method, however, a motion estimation process, which has already been performed when encoding the image data into the MPEG-4 bitstream, should be re-executed on each macroblock of the decoded image data in order to encode the decoded image data into an H.264 bitstream. Therefore, the cascaded pixel-domain transcoding method is not suitable for real-time transmissions of moving pictures, because it requires considerable amounts of time and money to transcode the moving pictures.

Figure 3:
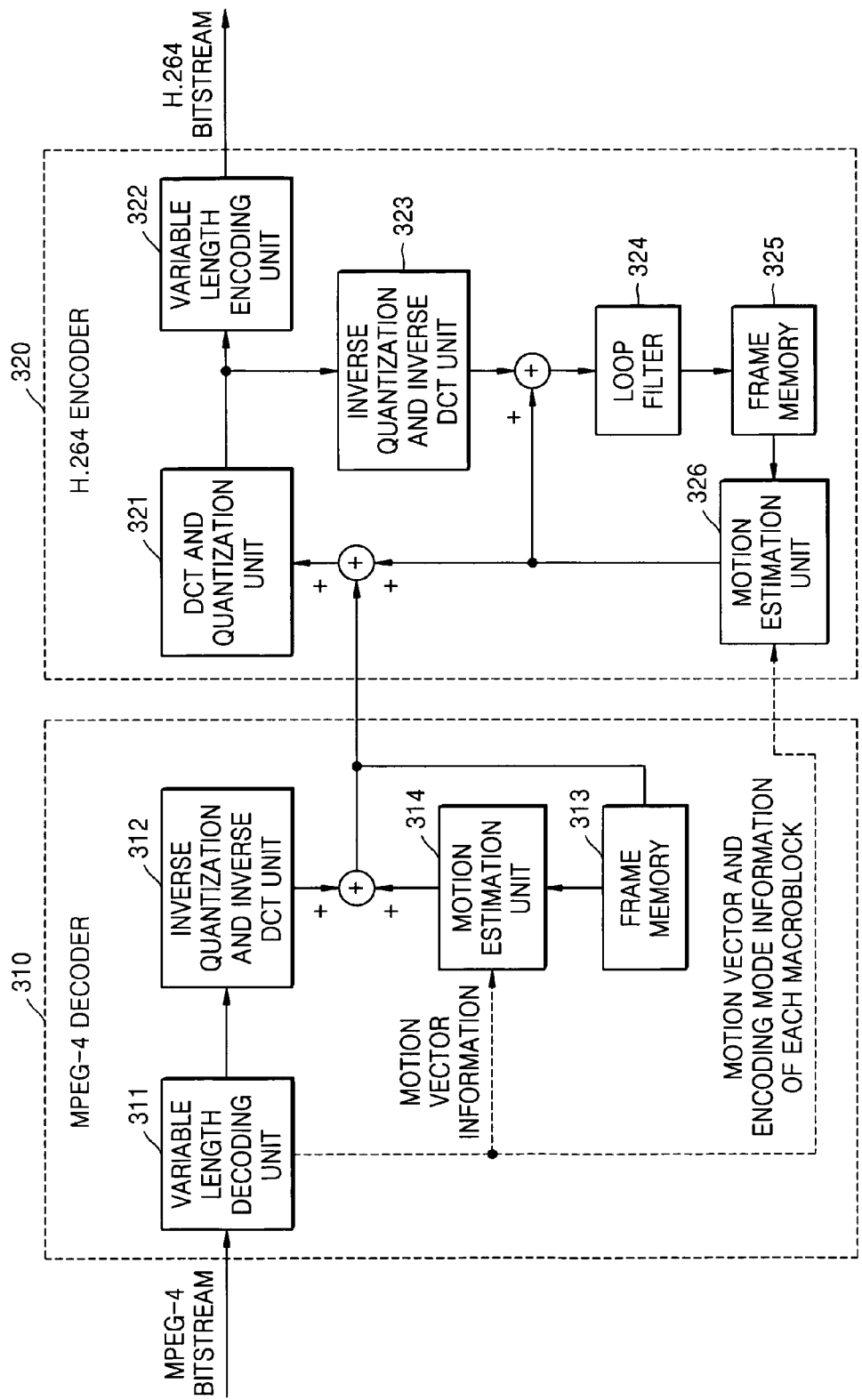
FIG. 3 is a block diagram of a pixel-domain transcoding apparatus according to an exemplary embodiment of the present invention.

FIG. 3 is a block diagram of a pixel-domain transcoding apparatus according to an exemplary embodiment of the present invention. The pixel-domain transcoding apparatus includes an MPEG-4 decoder 310 and an H.264 encoder 320. The pixel-domain transcoding apparatus can transmit moving picture data in real time by letting the H.264 encoder 320 use encoding mode information and motion vector information, which are obtained by using the MPEG-4 decoder 310 to decode an MPEG-4 bit stream. In addition, the pixel-domain transcoding apparatus decodes the MPEG-4 bitstream into pixel-domain data and then converts the pixel-domain data into an H.264 bitstream.

More specifically, a variable length decoding unit 311 receives an MPEG-4 bitstream, variable-length-decodes the MPEG-4 bitstream, and outputs frame type information, macroblock information, and motion vector information of the variable-length-decoded MPEG-4 bitstream. The frame type information specifies whether each frame of the variable-length-decoded MPEG-4 bitstream is an I frame or a predictive (P) frame, the macroblock information specifies in which encoding mode a motion estimation process has been performed when encoding each macroblock of predetermined image data into the MPEG-4 bitstream. The motion vector information is transmitted not only to a motion estimation unit 314 of the MPEG-4 decoder 310 and but also to a motion estimation unit 326 of the H.264 encoder 320. The macroblock information is transmitted to the motion estimation unit 326 of the H.264 encoder 320.

An inverse quantization and inverse discrete cosine transform (DCT) unit 312 inversely quantizes and inversely DCTs the variable-length-decoded MPEG-4 bitstream so that the variable-length-decoded MPEG-4 bitstream can be converted into pixel-domain data. The pixel-domain data is output to the H.264 encoder 320. The pixel-domain data is stored in a frame memory 313 and then input to the motion estimation unit 314 so that it can be used in a motion estimation process. The motion estimation unit 314 performs a motion estimation process by using the motion vector information received from the variable length decoding unit 311.

The H.264 encoder 320 converts the pixel-domain data into an H.264 bitstream by H.264-encoding each frame of the pixel-domain data and then quantizing and DCTing the H.264-coded pixel-domain data using a DCT and quantization unit 321 and a variable length encoding unit 322. The motion estimation unit 326 of the H.264 encoder 320 performs motion estimation by using the motion vector information and the macroblock information received from the MPEG-4 decoder 310. The motion estimation unit 326 performs motion estimation by using frames, which are obtained by inversely quantizing and inversely DCTing a DCTed and quantized bitstream and then stored in a frame memory 325 via a loop filter 324.

If MPEG-4 frames input to the variable length decoding unit 311 are P frames, the H.264 encoder 320 can use an encoding mode and a motion vector of each block of each of the MPEG-4 frames, thereby omitting a time-consuming motion estimation process. However, since H.264 performs motion estimation and motion compensation processes on a quarter pixel-by-quarter pixel basis and provides seven variable block sizes and eleven encoding modes, the encoding mode of each block of each of the MPEG-4 frames should be converted into a more complicated H.264 encoding mode.

FIGS. 4A through 4D are diagrams illustrating a method of converting an MPEG-4 encoding mode into an H.264 encoding mode. An MPEG-4 encoding mode is converted into an H.264 encoding mode in order to make an H.264 encoder use encoding mode information obtained by decoding an MPEG-4 bitstream. In general, the H.264 encoder performs a motion estimation process in all available encoding modes and then determines one of the encoding modes as an optimal encoding mode. Thus, if the H.264 encoder is able to use encoding mode information obtained from the decoded MPEG-4 stream, it does not have to perform the motion estimation process in all of the available encoding modes. Therefore, the H.264 encoder can reduce the amount of computation necessary for converting the MPEG-4 bitstream into an H.264 bitstream by performing the motion estimation process in only some of the available encoding modes.

Figure 4A:
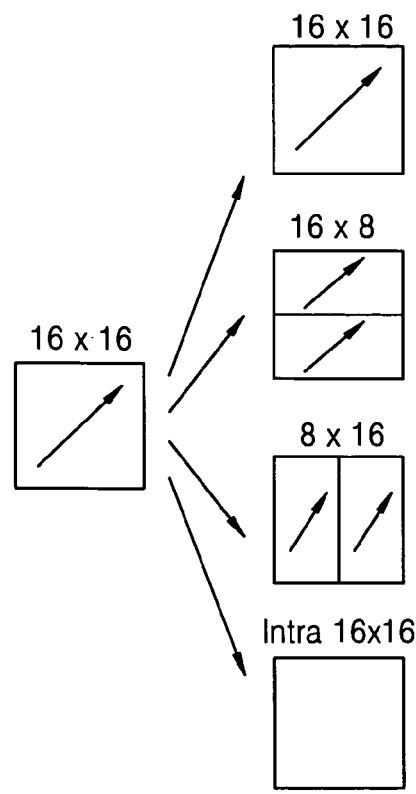
FIGS. 4A through 4D are diagrams illustrating a method of converting an MPEG-4 encoding mode into a H.264 encoding mode.

Referring to FIG. 4A, if an encoding mode of each block of the MPEG-4 frame is a 16×16 inter mode, the H.264 performs a motion estimation process on each block of an MPEG-4 frame in a 16×16 inter mode, a 16×16 inter mode, a 8×16 inter mode, and a 16×16 intra mode.

Figure 4B:
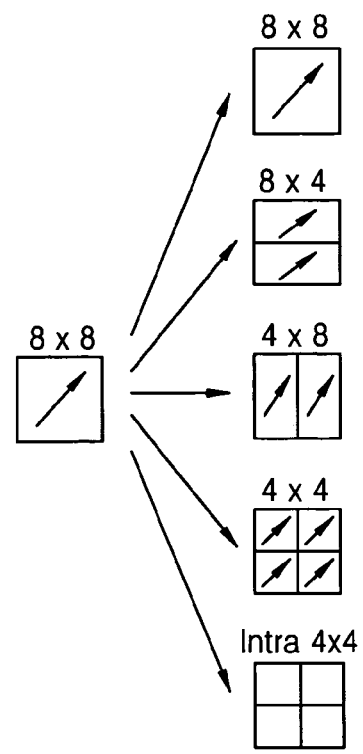

Referring to FIG. 4B, if the encoding mode of each block of an MPEG-4 frame is a 8×8 inter mode, the H.264 encoder performs the motion estimation process on each block of the MPEG-4 frame in a 8×8 inter mode, a 8×4 inter mode, a 4×8 inter mode, a 4×4 inter mode, and a 4×4 intra mode.

Figure 4C:
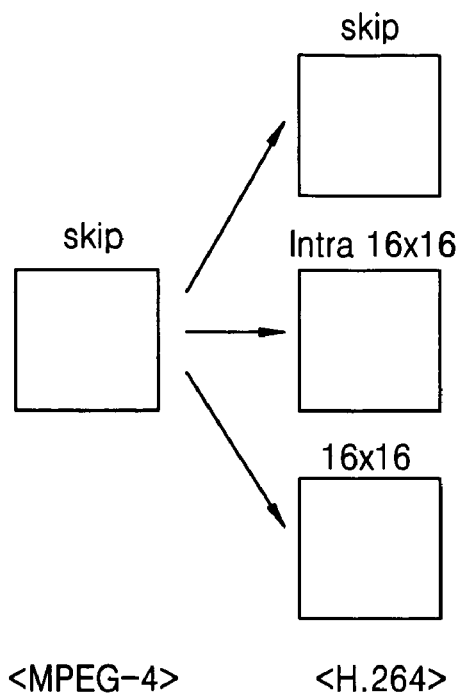

Referring to FIG. 4C, if the encoding mode of each block of the MPEG-4 frame is a skip mode, the H.264 encoder performs the motion estimation process on each block of each block of the MPEG-4 frame in a skip mode, a 16×16 intra mode, and a 16×16 inter mode. In the skip mode, encoding mode information of only some blocks to be encoded is transmitted or stored. Pixels in a block of a current frame corresponding to the background of an image are more likely to have the same values as their respective pixels in a corresponding block of a reference frame, in which case, only encoding mode information is transmitted or stored without the need to transmit or store coded data, such as residual error signals or motion vector information.

Figure 4D:
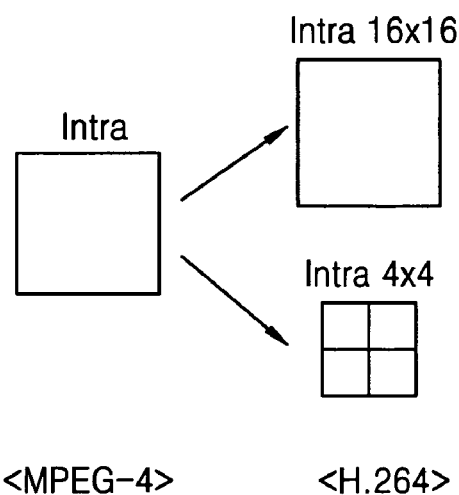

Referring to FIG. 4D, if the encoding mode of each block of the MPEG-4 frame is an intra mode, the H.264 encoder performs the motion estimation on each block of the MPEG-4 bitstream in a 4×4 intra mode and a 16×16 intra mode.

Since the H.264 encoder performs the motion estimation process on each block of the MPEG-4 frame in only a few encoding modes, it is possible to considerably reduce the amount of computation required for converting an MPEG-4 bitstream into an H.264 bitstream. In a case where a 4×4 intra-encoding mode and a 16×16 intra-encoding mode are selected, and eventually, one of them is bound to be determined as an optimal encoding mode, it may not be appropriate to use a rate-distortion optimization technique because the rate-distortion optimization technique makes the structure of an entire transcoding apparatus too complicated. Preferably, but not necessarily, one of the 4×4 intra-encoding mode and the 16×16 intra-encoding mode that provides a lowest rate-distortion cost is determined as an optimal encoding mode using a mean square error (MSE) technique, instead of the rate-distortion optimization technique.

In order to reduce the complexity of computation, the bit rate may be adjusted to be compatible with a given network bandwidth by setting quantization parameters to higher values in a transcoding process. In the present invention, bit rate may be adjusted by cutting a current frame rate to a half using a motion vector interpolation method. When cutting a current frame rate to a half in order to transcode an MPEG-4 bitstream into an H.264 bitstream, it is necessary to interpolate a motion vector of a block of an H.264 frame by using motion vector information of a skipped MPEG-4 frame.

Figure 5:
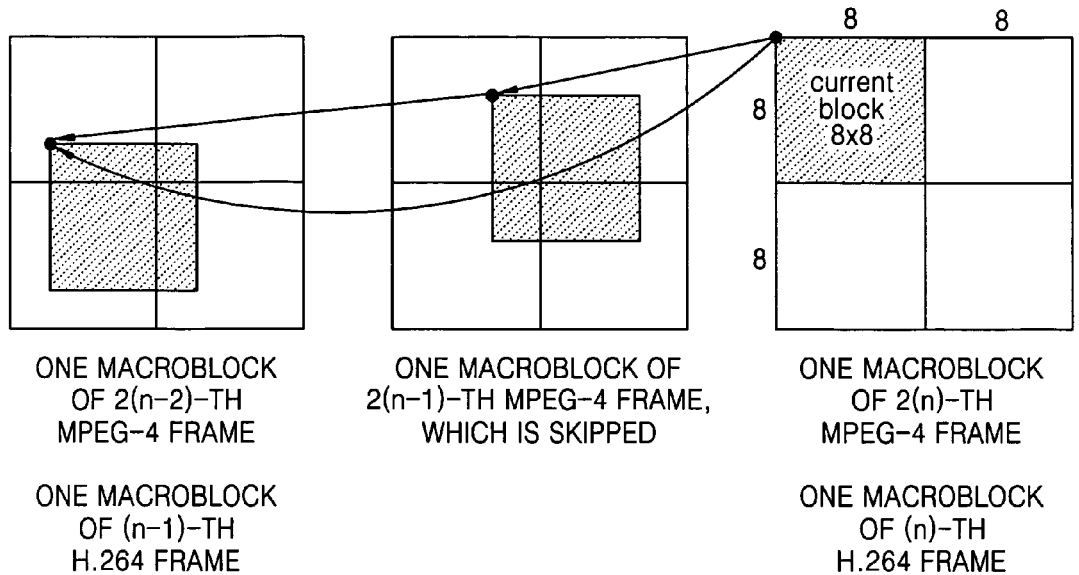
FIG. 5 is a diagram illustrating a method of interpolating a motion vector of a block of an H.264 frame by using a motion vector of a block of a skipped MPEG-4 frame.

FIG. 5 is a diagram illustrating a method of interpolating a motion vector of a block of an H.264 frame by using a motion vector of a block of a skipped MPEG-4 frame. In the case of cutting a frame rate to a half when transcoding an MPEG-4 bitstream into an H.264 bitstream, an n-th H.264 frame corresponds to an 2n-th MPEG-4 frame, and a (2n−1)-th MPEG-4 frame, which is a skipped frame, corresponds to somewhere between n-th and (n−1)-th H.264 frames. A motion vector of a block of the (2n−1)-th MPEG-4 frame is obtained by referring to a (2n−1)-th MPEG-4 frame. A motion vector of a current block of the n-th H.264 frame, which refers to the (n−1)-th H.264 frame, can be obtained by adding a motion vector of a corresponding block of the 2n-th MPEG-4 frame and a motion vector of a corresponding block of the (2n−1)-th MPEG-4 frame.

A motion vector interpolation method, which obtains a motion vector of a current block of an H.264 frame by using a motion vector of a corresponding block of a skipped MPEG-4 frame, will now be described.

Figure 6A:
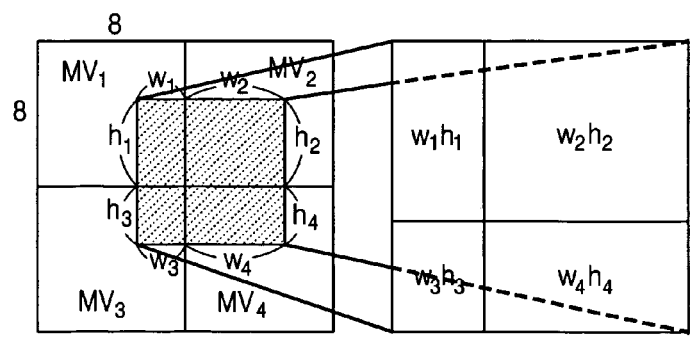
FIG. 6A is a diagram illustrating a method of computing a motion vector through a binary interpolation method.

FIG. 6A is a diagram illustrating a method of computing a motion vector through a binary interpolation method. The MPEG-4 standard provides two different encoding modes, i.e., a 16×16 block encoding mode and an 8×8 block encoding mode. Since a 16×16 block motion vector can be divided into four 8×8 block motion vectors, all MPEG-4 frames can be represented by 8×8 block motion vectors. A motion vector of a current block of an H.264 frame can be obtained by using 8×8 motion vector information of a skipped MPEG-4 frame.

Referring to FIG. 6A, since, according to the MPEG-4 standard, motion vectors can be represented in an 8×8 block encoding mode, a motion vector MV of the current 8×8 block of the H.264 frame can be defined using Equation (4) below:

$$MV = \frac{\sum_{i=1}^{4}(w_i \times h_i \times MV_i)}{\sum_{i=1}^{4}(w_i \times h_i)} \quad (4)$$

where $w_i$ and $h_i$ (where i=1, 2, 3, or 4) indicate horizontal and vertical lengths, respectively, of an i-th sub-block of the current 8H8 block of the H.264 frame overlapping a block of the skipped MPEG-4 frame, and $MV_i$ indicates a motion vector of the i-th sub-block. In other words, motion vectors of a 16×16, 16×8, 8×16, or 8×8 blocks of the H.264 frame can be obtained by using an encoding mode of each 8H8 block of the skipped MPEG-4 frame.

Figure 6B:
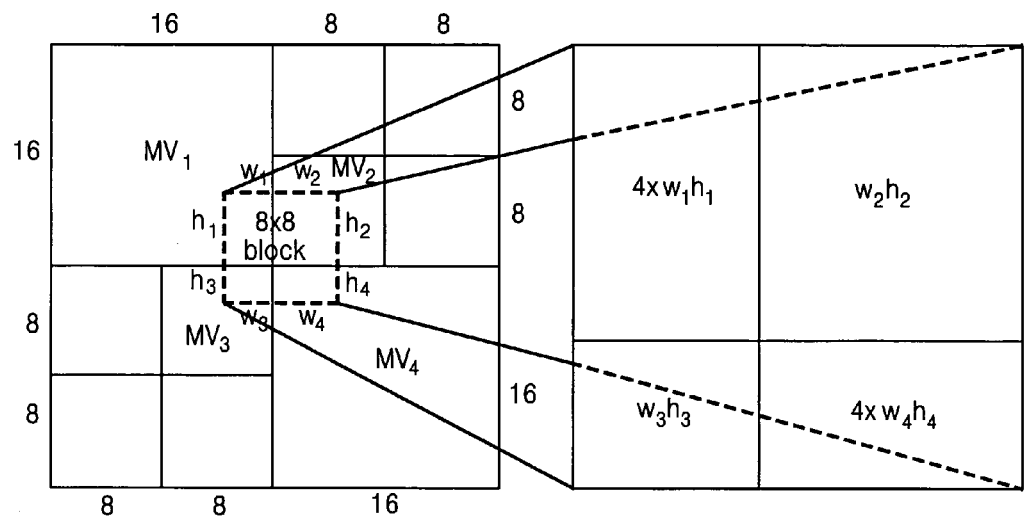
FIG. 6B is a diagram illustrating a method of computing a motion vector through a weighted binary interpolation method.

FIG. 6B is a diagram illustrating a method of computing a motion vector through a weighted binary interpolation method.

MPEG-4 provides two encoding modes, i.e., a 16×16 encoding mode and a 8×8 encoding mode. An 16×16 MPEG-4 block contains four times as much pixel information as an 8×8 MPEG-4 block. Thus, when performing a binary interpolation process using the 16×16 encoding mode, the 16×16 MPEG-4 block is weighted four times greater than the 8×8 MPEG-4 block. In other words, if blocks of a skipped MPEG-4 frame overlapped by a current block of an H.264 frame are 16×16 blocks, motion vectors of the corresponding blocks are weighted regardless of the areas of the blocks of the skipped MPEG-4 frame overlapped by the current block of the H.264 frame. Therefore, a final motion vector MV of the current block of the H.264 frame can be calculated using Equation (5) below:

$$MV = \frac{4w_i h_i \times MV_1 + w_2 h_2 \times MV_2 + w_3 h_3 \times MV_3 + 4w_4 h_4 \times MV_4}{4w_i h_i + w_2 h_2 + w_3 h_3 + 4w_4 h_4} \quad (5)$$

Figure 6C:
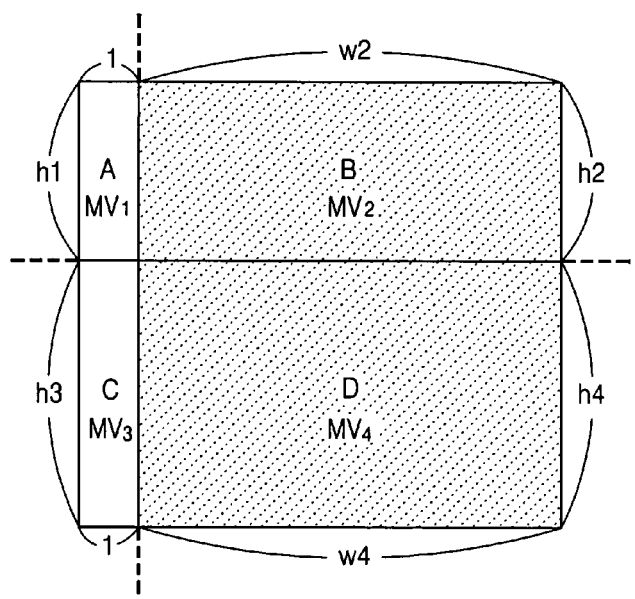
FIG. 6C is a diagram illustrating a method of computing a motion vector through a constrained binary interpolation method.

FIG. 6C is a diagram illustrating a method of computing a motion vector through a constrained binary interpolation method.

The area of a current 8×8 block of an H.264 frame overlapping blocks of a skipped MPEG-4 frame varies depending on the location of the current 8×8 block on the skipped MPEG-4 frame. However, if at least one of the length or width of an i-th sub-block of the current 8×8 block of the H.264 frame, i.e., at least one of $w_i$ and $h_i$, is set to 1, the influence of the i-th sub-block of the current 8×8 block of the H.264 frame on a motion vector of the entire current 8×8 block of the H.264 frame can be ignored. Referring to FIG. 6C, first and third sub-blocks A and C of the current 8×8 block of the H.264 frame are excluded from calculation of the motion vector of the current 8×8 block of the H.264 frame. Only second and fourth sub-blocks B and D of the 8H8 block are considered in the calculation of the current 8×8 block of the H.264 frame. In other words, if at least one of $w_i$ and $h_i$ is set to 1, the i-th sub-block of the current 8×8 block of the H.264 frame is excluded from the calculation of the motion vector of the current 8×8 block of the H.264 frame. The accuracy of the calculation of the motion vector of the current 8×8 block of the H.264 frame can be enhanced by ignoring sub-blocks of the current 8×8 block of the H.264 frame with relatively small areas, and the calculation of the motion vector of the current 8×8 block of the H.264 frame can be expressed by Equation (6) below:

$$MV = \frac{w_2 h_2 \times MV_2 + w_4 h_4 \times MV_4}{w_2 h_2 + w_4 h_4} \quad (6)$$

The three motion vector interpolation methods according to the present invention enable an H.264 encoder to reuse integer pixel motion vectors obtained from MPEG-4 frames, thereby reducing a search range from ±16 to ±2. Accordingly, it is possible to reduce the amount of computation required for motion estimation while improving quality of pictures. In other words, it is possible to efficiently search for motion vectors without searching as wide a search area as a ±16 pixel domain.

The above-described motion vector interpolation methods can be used independently of one another, or two of them can be used together. For example, the weighted binary interpolation method and the constrained binary interpolation method can be used together. Alternatively, each of the above-described motion vector interpolation methods can be used together with one of the methods of converting an MPEG-4 encoding mode into an H.264 encoding mode of FIGS. 4A through 4D.

Figure 7:
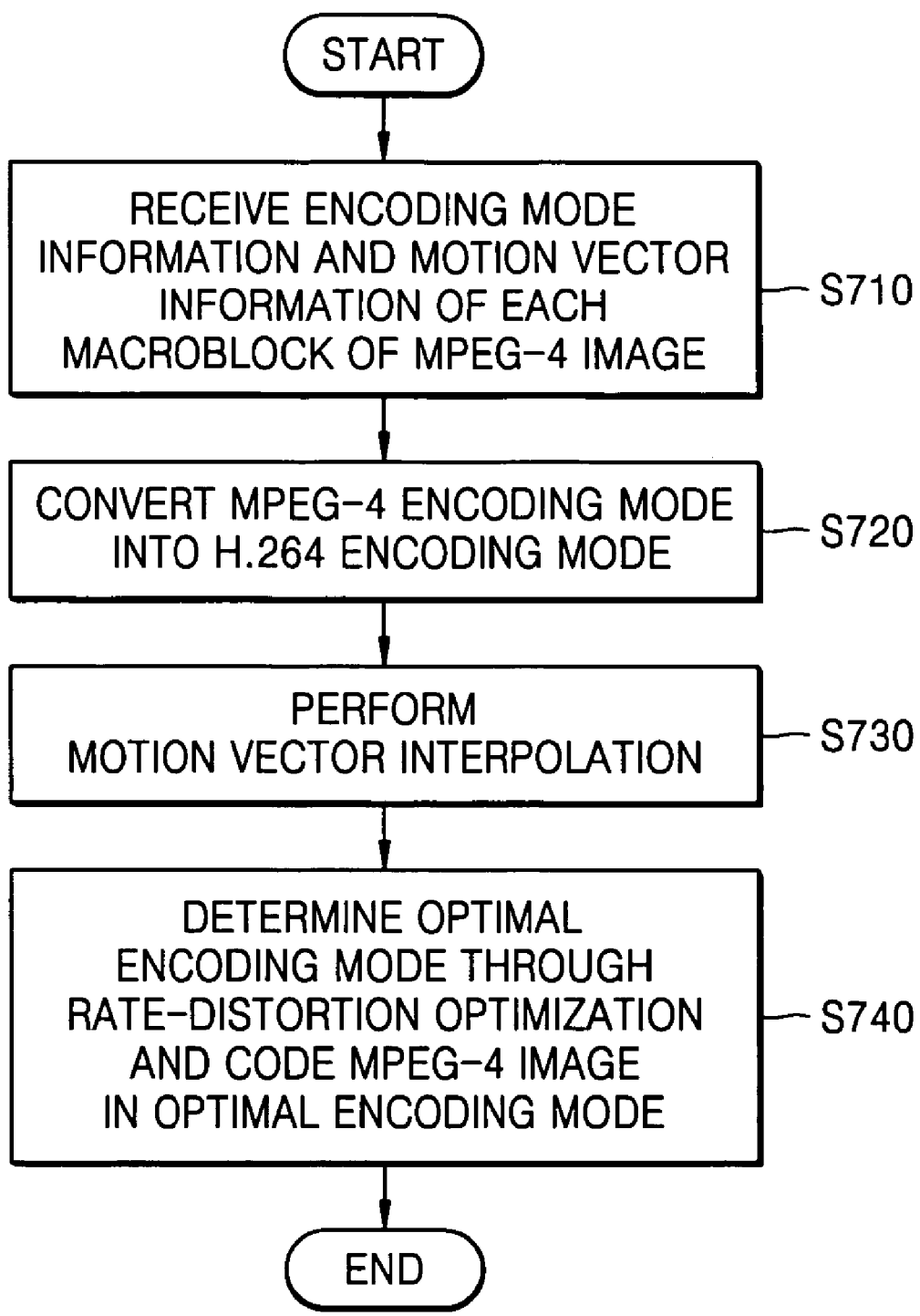
FIG. 7 is a flowchart of a pixel-domain transcoding method according to an exemplary embodiment of the present invention.

FIG. 7 is a flowchart of a pixel-domain transcoding method according to an exemplary embodiment of the present invention. Referring to FIG. 7, encoding mode information and motion vector information of each macroblock of an MPEG-4 frame are received in operation S710. In operation S720, some of all available H.264 encoding modes are selected based on the encoding mode information of each macroblock of the MPEG-4 frame. A method of selecting some of the available H.264 encoding modes has already been described above with reference to FIGS. 4A through 4D. In operation S730, if there is a need to cut a frame rate to a half, motion vectors are obtained using a motion vector interpolation method in operation S730. The motion vector interpolation method has already been described above with reference to FIGS. 6A through 6C. In operation S740, one of the selected H.264 encoding modes is determined as an optimal encoding mode using a rate-distortion optimization technique.

The performance of the present invention was evaluated by using a MoMuSys decoder, which can decode MPEG-4 SP images, and a Joint Model (JM) 53 encoder, which can encode H.264 BP images. In the evaluation, a Pentium IV 2.66 GHz processor, 4 image data with quarter common interface format (QCIF, 176×144 pixels) resolution, and 3 image data with common interface format (CIF, 352×288 pixels) resolution were used. Here, each of the seven image data contains a total of 300 frames with a frame rate of 30 Hz. The JM 42 encoder performed motion estimation and compensation processes on blocks of 7 variable sizes, (16×16, 16×8, 8×16, 8×8, 8×4, 4×8, and 4×4), carried out an integer pixel motion vector search on a ±16 search range basis, performed quarter pixel motion estimation and compensation processes and a 4×4 integer DCT process, and adopted a rate-distortion optimization technique.

A first frame of each of the seven image data was coded as an intra frame, and the rest of the frames of each of the seven image data were coded as predictive frames. 300 frames of each of the seven image data were evaluated by skipping every other frame of each of the seven image data so that the frame rate of each of the seven image data can be cut to a half, i.e., 15 Hz. In an H.264-based motion vector interpolation process, a candidate vector was searched for among motion vectors of integer pixels in each frame of the MPEG-4 image data by using one of the motion vector interpolation methods described above, i.e., one of the binary interpolation method, the weighted binary interpolation method, and the constrained binary interpolation method, a half pixel motion vector was searched for in a ±2 search range of the candidate vector, and a quarter pixel motion vector was searched for among eight quarter pixels adjacent to the half pixel motion vector.

The above-described motion vector interpolation methods can be used together with a block encoding mode conversion method or independently to cut a current frame rate.

Figure 8:
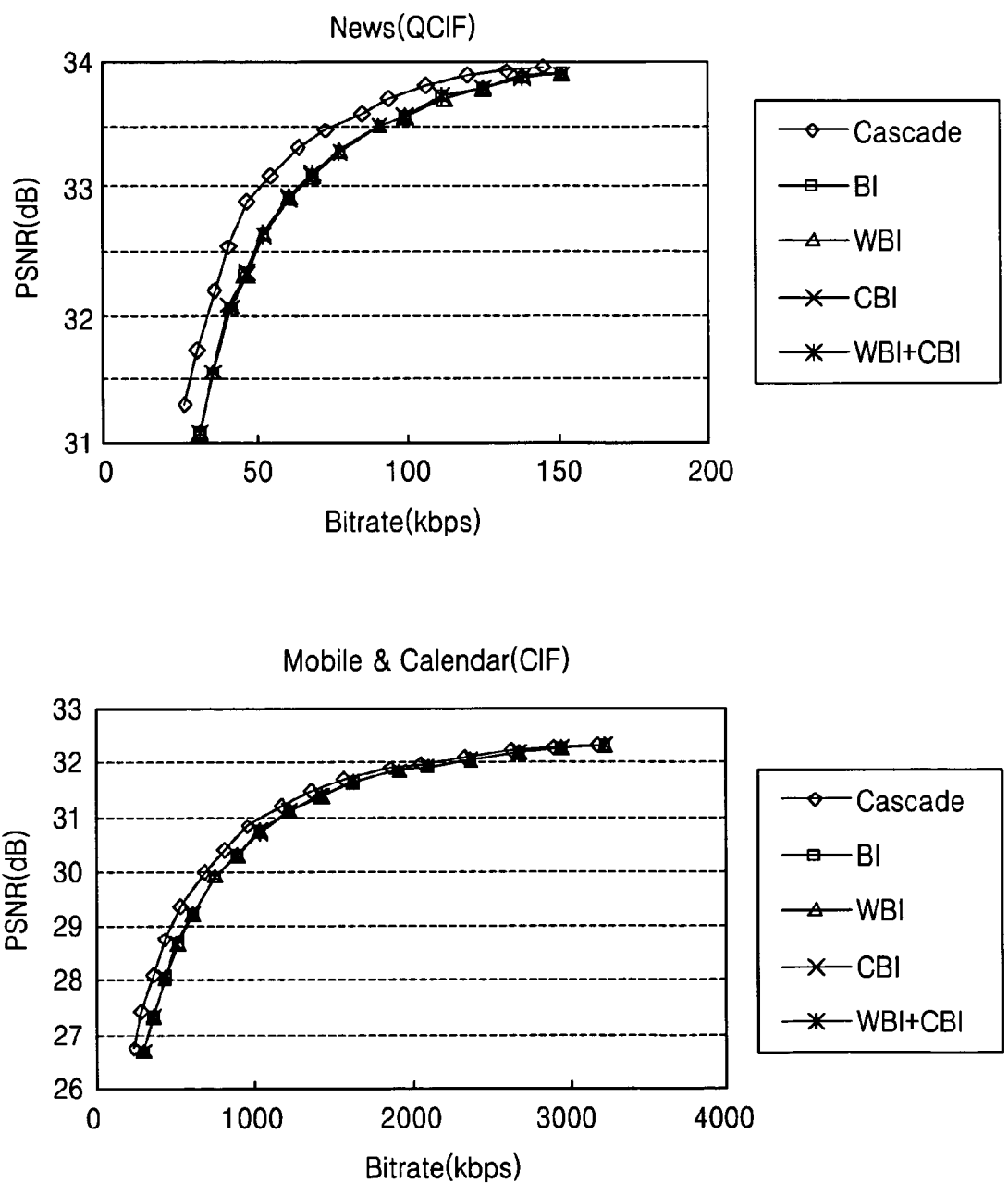
FIG. 8 is a graph illustrating the variations of peak signal noise ratios (PSNRs) in accordance with the variation of bit rate when applying various transcoding methods according to the present invention to test images.

FIG. 8 illustrates the variations of peak signal-to-noise ratios (PSNR) of various transcoding methods in accordance with the variation of bit rate. Referring to FIG. 8, 'Cascade' denotes the cascaded pixel domain transcoding method, 'BI' denotes the binary interpolation method, 'WBI' denotes the weighted binary interpolation method, 'CBI' denotes the constrained binary interpolation method, and 'WBI+CBI' denote a combination of the weighted binary interpolation method and the constrained binary interpolation method.

Results show that the various transcoding methods according to the present invention have a PSNR loss of about 0.2 dB at low bit rates and a PSNR loss of up to 0.7 dB at higher bit rates, compared to the cascaded pixel domain transcoding method. In addition, the present invention achieves a PSNR of about 33.1 dB at a bit rate of about 70 kbps, which demonstrates that the present invention is capable of providing high-quality pictures suitable for various mobile terminal application programs. In the case of mobile and calendar image data with CIF resolution, the various transcoding methods according to the present invention almost achieve the same results, as shown in the lower half of FIG. 8. In addition, the various transcoding methods according to the present invention have a PSNR loss of about 0.2 dB at high bit rates and a PSNR loss of up to 0.9 dB at lower bit rates, compared to the cascaded pixel domain transcoding method.

Figure 9:
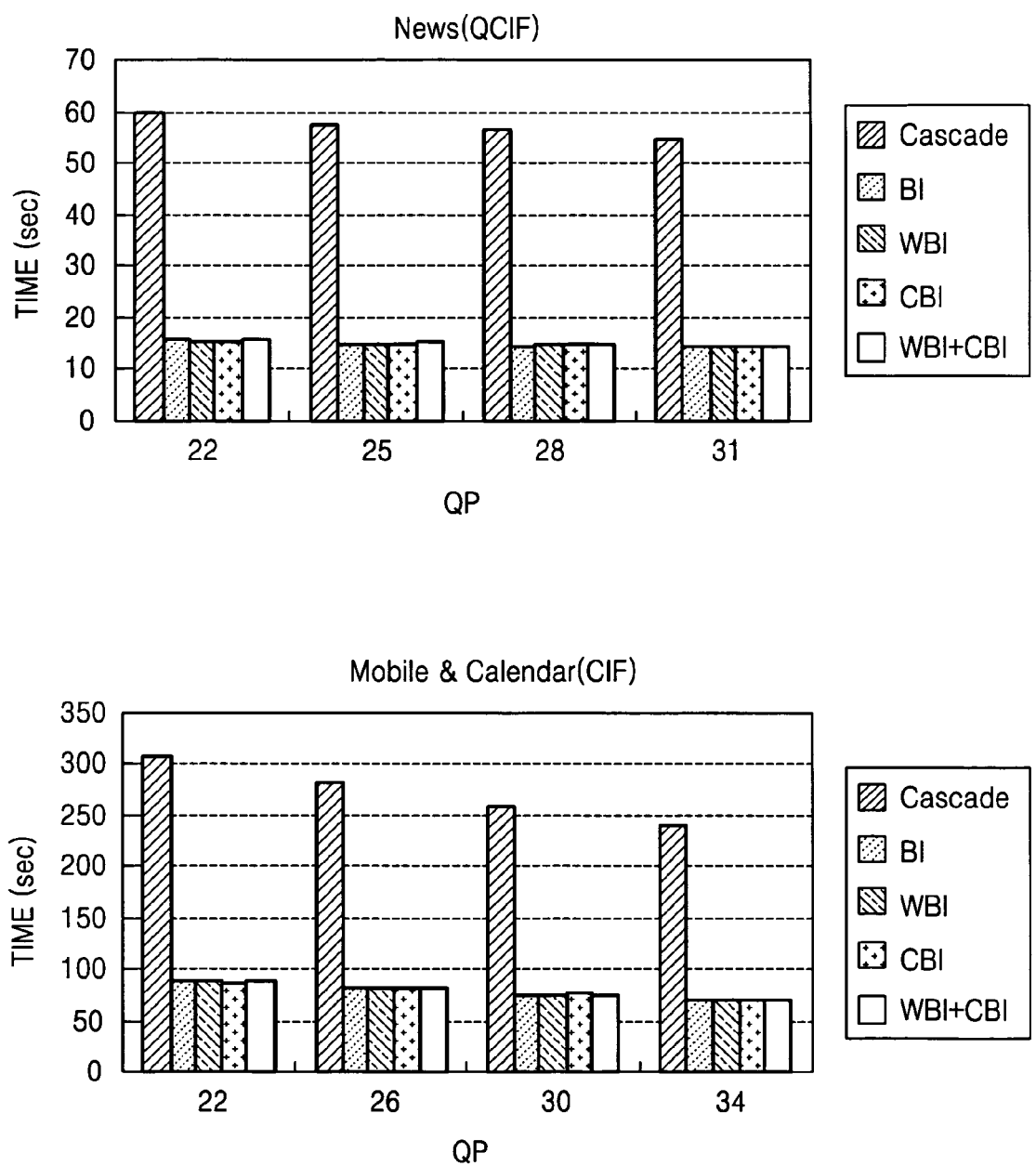
FIG. 9 is a graph illustrating the time taken to transcode each of the test images by using each of the various transcoding methods according to the present invention.

FIG. 9 illustrates how much time was taken to transcode news image data with QCIF resolution and the mobile and calendar image data with CIF resolution when using each of the cascaded pixel-domain transcoding method and the various transcoding methods according to the present invention. Referring to FIG. 9, the various transcoding methods according to the present invention transcode the QCIF image data three and a fifth to four times faster than the cascaded pixel-domain transcoding method and transcode the CIF image data three and a third to four times faster than the cascaded pixel-domain transcoding method. The various transcoding methods according to the present invention spend almost the same amount of time transcoding either the QCIF image data or the CIF image data. In FIG. 9, vertical axes denote the amount of time taken to code 300 MPEG-4 frames into 150 H.264 frames, and horizontal axes QP denote H.264 quantization coefficients.

The transcoding methods according to the present invention may be implemented as a computer program. Codes and code segments of the computer program may be implemented based on the description provided herein and stored in a computer-readable medium. When read and executed by a computer, the transcoding methods according to the present invention may be performed. The computer-readable medium may include a magnetic storage medium, an optical storage medium, and a carrier wave medium.

According to the present invention as described above, it is possible to considerably reduce the time taken to convert MPEG-4 image data into H.264 image data by simplifying an entire transcoding process without deterioration of the quality of pictures.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A transcoding method comprising:
   (a) decoding, by using a decoder, an image coded in a first encoding method and then obtaining, by using a decoder, encoding mode information and motion vector information of each block of the image;
   (b) selecting, by using an encoder, at least one of available encoding modes of a second encoding method based on the encoding mode information of each block of the decoded image;
   (c) performing, by using the encoder, a motion estimation process on each block of the decoded image in the at least one selected encoding mode and then determining, by using the encoder, an optimal encoding mode for each block of the decoded image based on a motion estimation result; and
   (d) performing, by using the encoder, the motion estimation process on each block of the decoded image in the optimal encoding mode and outputting, by using the encoder, data coded in the second encoding method for the decoded image.

2. The transcoding method of claim 1, wherein in (b), if an encoding mode of each block of the decoded image is an inter 16×16 mode, the inter 16×16 mode, an inter 16×8 mode, an inter 8×16 mode, and an intra 16×16 mode are selected as encoding modes for the second encoding method, and if the encoding mode of each block of the decoded image is an inter 8×8 mode, the inter 8×8 mode, an inter 8×4 mode, an inter 4×8 mode, and an intra 4×4 mode are selected as the encoding modes for the second encoding method.

3. The transcoding method of claim 1, wherein in (b), if an encoding mode of each block of the decoded image is a skip mode, the skip mode, an inter 16×16 mode, and an intra 16×16 mode are selected as encoding modes for the second encoding method, and if the encoding mode of each block of the decoded image is an intra mode, the intra 16×16 mode and an intra 8×8 mode are selected as the encoding modes for the second encoding method.

4. The transcoding method of claim 1, wherein in (c), a motion vector of a current block in a current frame of the decoded image is readjusted by performing the motion estimation process on the current block in the at least one selected encoding mode.

5. The transcoding method of claim 1, wherein in (c), an encoding mode of each block of the decoded image is determined by using a rate-distortion optimization method.

6. The transcoding method of claim 5, wherein if the at least one selected encoding mode is an intra 16×16 mode or an intra 8×8 mode, an encoding mode of a current block in a current frame of the decoded image is determined based on a result of calculating a mean square error of a pixel value of the current block and a pixel value of a corresponding block in a previous frame of the decoded image.

7. The transcoding method of claim 4, wherein in (c), the motion vector of the current block is obtained in the at least one selected encoding mode by using areas of a predetermined block in a previous frame, corresponding to the current block, overlapping blocks of the previous frame and motion vectors of the blocks overlapped by the predetermined block.

8. The transcoding method of claim 7, wherein in (c), the motion vector of the current block is obtained by multiplying the areas of the predetermined block overlapping the blocks of the previous frame and the motion vectors of the blocks overlapped by the predetermined block and then averaging the multiplication results.

9. The transcoding method of claim 7, wherein in (c), if the blocks overlapped by the predetermined block are 16×16 blocks, motion vectors of the corresponding blocks are weighted.

10. The transcoding method of claim 7, wherein in (c), if each of the areas of the predetermined block overlapping the blocks of the previous frame has a length of 1 pixel or a width of 1 pixel, the blocks overlapped by the predetermined block are excluded from the calculation of the motion vector of the current block.

11. The transcoding method of claim 1, wherein the first encoding method is an MPEG-4 encoding method, and the second encoding method is an H.264 encoding method.

12. A transcoding apparatus comprising:
   a decoder, which decodes an image coded in a first encoding method and outputs encoding mode information and motion vector information of each block of the image; and
   an encoder, which selects at least one of available encoding modes of a second encoding method based on the encoding mode information of each block of the decoded image, performs a motion estimation process on each block of the decoded image in the at least one selected encoding mode, determines an optimal encoding mode for each block of the decoded image based on a motion estimation result, performs the motion estimation process on each block of the decoded image in the optimal encoding mode, and outputs data coded in the second encoding method for the decoded image.

13. The transcoding apparatus of claim 12, wherein the encoder selects an inter 16×16 mode, an inter 16×8 mode, an inter 8×16 mode, and an intra 16×16 mode as encoding modes for the second encoding method, if an encoding mode of each block of the decoded image is the inter 16×16 mode, and selects an inter 8×8 mode, an inter 8×4 mode, an inter 4×8 mode, and an intra 4×4 mode as the encoding modes for the second encoding method if the encoding mode of each block of the decoded image is the inter 8×8 mode.

14. The transcoding apparatus of claim 12, wherein the encoder selects a skip mode, an inter 16×16 mode, and an intra 16×16 mode as encoding modes for the second encoding method, if an encoding mode of each block of the decoded image is the skip mode, and selects the intra 16×16 mode and an ultra 8×8 mode as the encoding modes for the second encoding method if the encoding mode of each block of the decoded image is an intra mode.

15. The transcoding apparatus of claim 12, wherein the encoder calculates the motion vector of the current block in a current frame of the decoded image by using areas of the predetermined frame overlapping the blocks of the previous frame and the encoding mode information of the blocks overlapped by the predetermined block.

16. The transcoding apparatus of claim 15, wherein the encoder calculates the motion vector of the current block by multiplying the areas of the predetermined block overlapping the blocks of the previous frame and the motion vectors of the blocks overlapped by the predetermined block to generate multiplication results and then averaging the multiplication results.

17. The transcoding apparatus of claim 15, wherein the encoder weights motion vectors of the corresponding blocks if the blocks overlapped by the predetermined block are 16×16 blocks.

18. The transcoding apparatus of claim 15, wherein the encoder excludes the blocks overlapped by the predetermined block from the calculation of the motion vector of the current block if each of the areas of the predetermined block overlapping the blocks of the previous frame has a length of 1 pixel or a width of 1 pixel.

19. The transcoding apparatus of claim 12, wherein the first encoding method is an MPEG-4 encoding method, and the second encoding method is an H.264 encoding method.

* * * * *

UNITED STATES PATENT AND TRADEMARK OFFICE
CERTIFICATE OF CORRECTION

PATENT NO. : 7,620,107 B2
APPLICATION NO. : 11/074078
DATED : November 17, 2009
INVENTOR(S) : Yung-lyul Lee, Sung-sun Lee and Young-hwan You It is certified that error appears in the above-identified patent and that said Letters Patent is hereby corrected as shown below:

On the Title Page, under item

(75) Inventors: Yung-lyul Lee, Seoul (KR); Sung-sun Lee, Seoul (KR): add, Young-hwan You, Seoul (KR)

Signed and Sealed this

Ninth Day of February, 2010

David J. Kappos
*Director of the United States Patent and Trademark Office*